US007283492B2

(12) United States Patent
Malladi et al.

(10) Patent No.: US 7,283,492 B2
(45) Date of Patent: Oct. 16, 2007

(54) SYSTEMS AND METHODS FOR MULTIPLEXING CONTROL INFORMATION ONTO A PHYSICAL DATA CHANNEL

(75) Inventors: Durga Prasad Malladi, San Diego, CA (US); Serge D. Willenegger, Onnens (CH)

(73) Assignee: QUALCOMM Incorporated, San Diego, CA (US)

( * ) Notice: Subject to any disclaimer, the term of this patent is extended or adjusted under 35 U.S.C. 154(b) by 500 days.

(21) Appl. No.: 10/952,266

(22) Filed: Sep. 27, 2004

(65) Prior Publication Data

US 2005/0163071 A1 Jul. 28, 2005

Related U.S. Application Data

(60) Provisional application No. 60/508,536, filed on Oct. 2, 2003.

(51) Int. Cl.
*H04Q 7/00* (2006.01)
*H04Q 7/24* (2006.01)
*H04B 7/00* (2006.01)
*H04B 7/216* (2006.01)
*H04B 1/38* (2006.01)
*H04J 3/02* (2006.01)
*H04M 1/00* (2006.01)

(52) U.S. Cl. .................... 370/328; 370/537; 370/338; 370/441; 370/310; 455/550.1; 455/556.2; 455/561

(58) Field of Classification Search ............. 455/414.4, 455/550.1, 434, 464, 509, 561, 515–517, 455/450–451, 556.1, 556.2, 458; 370/310, 370/441, 328–338, 341–345, 347–349, 537, 370/913, 541–542, 915–916, 902
See application file for complete search history.

(56) References Cited

U.S. PATENT DOCUMENTS

| 5,440,542 | A | 8/1995 | Procter et al. | |
|---|---|---|---|---|
| 5,859,840 | A * | 1/1999 | Tiedemann, Jr. et al. | ... 370/335 |
| 6,266,321 | B1 * | 7/2001 | Pehkonen et al. | .......... 370/206 |
| 6,522,638 | B1 | 2/2003 | Haugli et al. | |
| 6,707,859 | B1 * | 3/2004 | Kinnunen et al. | .......... 375/316 |
| 6,816,507 | B1 * | 11/2004 | Jarbot et al. | ................. 370/465 |

(Continued)

OTHER PUBLICATIONS

Dahlman, E., et al. "WCDMA—The Radio Interface for Future Mobile Multimedia Communications," *IEEE Transactions on Vehicular Technology*, Nov. 1998, pp. 1105-1118.

*Primary Examiner*—Meless Zewdu
(74) *Attorney, Agent, or Firm*—Thomas R. Rouse; Charles D. Brown; Milan I. Patel

(57) ABSTRACT

Systems and methods for communicating control data for multiple physical data channels by transmitting control information for a first physical data channel on a physical control channel and combining the control information with information for a logical data channel and transmitting the combined information on a single physical data channel. In one embodiment, a method includes encoding and multiplexing data for a first data channel with control information for a second data channel, transmitting the multiplexed data on the first data channel, transmitting second data on the second data channel, and transmitting the control information for the first data channel on a control channel. The multiplexed data is then decoded using the control information from the control channel and demultiplexed. The demultiplexed control information for the second data channel is then used to decode the data on the second data channel.

34 Claims, 6 Drawing Sheets

U.S. PATENT DOCUMENTS

| | | |
|---|---|---|
| 6,985,471 B1 * | 1/2006 | Holma et al. ............... 370/342 |
| 6,987,778 B2 * | 1/2006 | Sindhushayana et al. ... 370/468 |
| 7,088,700 B2 * | 8/2006 | Lee et al. .................. 370/342 |
| 2002/0141436 A1 * | 10/2002 | Toskala ...................... 370/442 |
| 2003/0117989 A1 * | 6/2003 | Kim .......................... 370/342 |
| 2004/0228315 A1 * | 11/2004 | Malkamaki ................. 370/342 |

* cited by examiner

SYSTEMS AND METHODS FOR MULTIPLEXING CONTROL INFORMATION ONTO A PHYSICAL DATA CHANNEL

CLAIM OF PRIORITY UNDER 35 U.S.C. §119

The present Application for Patent claims priority to Provisional Application No. 60/508,536 entitled "Hierarchical Control Channel Structure" filed Oct. 2, 2003, and assigned to the assignee hereof and hereby expressly incorporated by reference herein.

REFERENCE TO CO-PENDING APPLICATIONS FOR PATENT

The present application for patent is related to the following co-pending U.S. patent applications:

"Systems and Method for Multiplexing Control Data for Multiple Data Channels Onto a Single Control Channel", having application Ser. No. 10/952,265, filed concurrently herewith, assigned to the assignee hereof, and expressly incorporated by reference herein; and "Systems and Method for Communication Control Data Using Multiple Slot Formats" having application Ser. No. 10/952,426, filed concurrently herewith, assigned to the assignee hereof, and expressly incorporated by reference herein.

BACKGROUND

1. Field

The present invention relates generally to communication systems and more particularly to systems and methods for providing control information for multiple data channels by combining the control information with information for a logical data channel and transmitting the combined information on a single physical data channel.

2. Background

A wireless telecommunications system may be used to enable information to be communicated between a mobile device and a base station, between a mobile device and an information server, between mobile devices, and so on. The information communicated between the various devices may include audio (e.g., voice) information, high speed data, control information and various other types of data.

One exemplary telecommunications system includes a base station controller, one or more base stations and one or more mobile stations. Each of the base stations is coupled to the base station controller by a network that is normally referred to as the backhaul network. The backhaul network typically comprises physical communication links between the base station controller and the base stations. Each of the mobile stations is coupled to one of the base stations. The communication links between the mobile stations and the base stations comprise wireless links.

The wireless communication link between each mobile station and the base station with which it communicates includes a set of channels for communicating data from the base station to the mobile station, as well as a set of channels for communicating data from the mobile station to the base station. The first set of channels (from base station to mobile station) are referred to as the forward link. The second set of channels (from mobile station to base station) are referred to as the reverse link.

The channels of both the forward link and reverse link are configured to carry various types of information. For example, some of the channels carry data, while others carry control information. In one embodiment, the reverse link includes a primary dedicated data channel and a corresponding dedicated control channel. The control channel is configured to carry information necessary to decode the primary dedicated data channel, such as an indication of the data rate at which data is transmitted on the data channel.

It may be desirable to add another data channel to this system. Just as with the primary dedicated data channel, it will be necessary to transmit control information for the additional data channel in order to enable the base station to decode the data that is transmitted on the additional data channel. Conventionally this control information would be transmitted on an additional control channel corresponding to the additional data channel. This solution, however, is disadvantageous in that it requires the use of resources (e.g., additional processing, additional spreading codes, etc.) to support the additional control channel. It would therefore be desirable to provide improved systems and methods for communicating the necessary control information for the additional data channel.

SUMMARY

Embodiments disclosed herein address the above stated needs by multiplexing control information for a second physical data channel with a logical data channel and transmitting the resulting multiplexed data on a first physical data channel. One embodiment comprises a method implemented in a WCDMA (wideband code division multiple access) communications system. This method includes providing first data to be transmitted on a first data channel, second data to be transmitted on a second data channel, control information for the first data channel and control information for the second data channel. The first data and the control information for the second data channel are then encoded and multiplexed together. The multiplexed data is then transmitted on the first data channel, the second data is transmitted on the second data channel, and the control information for the first data channel is transmitted on a control channel. When the data transmitted on the various channels is received, the control information for the first data channel is decoded and used to decode the multiplexed data on the first data channel. The multiplexed data is decoded and demultiplexed to obtain the first data and the control information for the second data channel. The second data is then decoded using the control information for the second data channel.

An alternative embodiment comprises a method implemented in a mobile station for a wireless communication system. This method includes providing first data to be transmitted on a first data channel, second data to be transmitted on a second data channel, control data for the first data channel and control data for the second data channel. The first data is then multiplexed with the control data for the second data channel. The multiplexed data is then transmitted on the first data channel, while the second data is transmitted on the second data channel, and the control data for the first data channel is transmitted on a control channel.

Another alternative embodiment comprises a method implemented in a base station for a wireless communication system. This method includes receiving data on a first data channel, a second data channel, and a control channel. The control data received via the control channel is decoded and used to decode multiplexed data received via the first data channel. The multiplexed data received via the first data channel is demultiplexed to obtain data for a logical data channel and additional control data. The additional control data is then used to decode data received via the second data channel.

Another alternative embodiment comprises a wireless communication system including a mobile station and a base station. The mobile station is configured to provide first data to be transmitted on a first data channel, second data to be transmitted on a second data channel, control information for the first data channel and control information for the second data channel. The mobile station is further configured to encode and multiplex the first data with the control information for the second data channel, and then transmit the multiplexed data on the first data channel, transmit the second data on the second data channel, and transmit the control information for the first data channel on a control channel. The base station is configured to receive the multiplexed data on the first data channel, the second data on the second data channel, and the control information for the first data channel on the control channel. The base station is further configured to decode the control information for the first data channel and use this control information to decode the multiplexed data received on the first data channel. The base station is further configured to demultiplex the multiplexed data into the first data and the control information for the second data channel and then decode the second data using the control information for the second data channel.

Another alternative embodiment comprises a mobile station for a wireless communication system including a transceiver subsystem and a processing subsystem coupled to the transceiver subsystem. The processing subsystem is configured to provide first data to be transmitted on a first data channel, second data to be transmitted on a second data channel, control data for the first data channel and control data for the second data channel. The processing subsystem is further configured to multiplex the first data with the control data for the second data channel. The transceiver subsystem is configured to transmit the multiplexed data on the first data channel, transmit the second data on the second data channel, and transmit the control data for the first data channel on a control channel.

Another alternative embodiment comprises a base station for a wireless communication system including a transceiver subsystem and a processing subsystem coupled to the transceiver subsystem. The transceiver subsystem is configured to receive data on a first data channel, a second data channel, and a control channel. The processing subsystem is configured to decode control data received via the control channel and use the control data received via the control channel to decode multiplexed data received via the first data channel. The processing subsystem is further configured to demultiplex the multiplexed data received via the first data channel to obtain additional control data and use the additional control data received via the first data channel to decode data received via the second data channel.

Numerous additional alternative embodiments are also possible.

BRIEF DESCRIPTION OF THE DRAWINGS

Various aspects and features of the invention are disclosed by the following detailed description and the references to the accompanying drawings, wherein.

Figure 1:
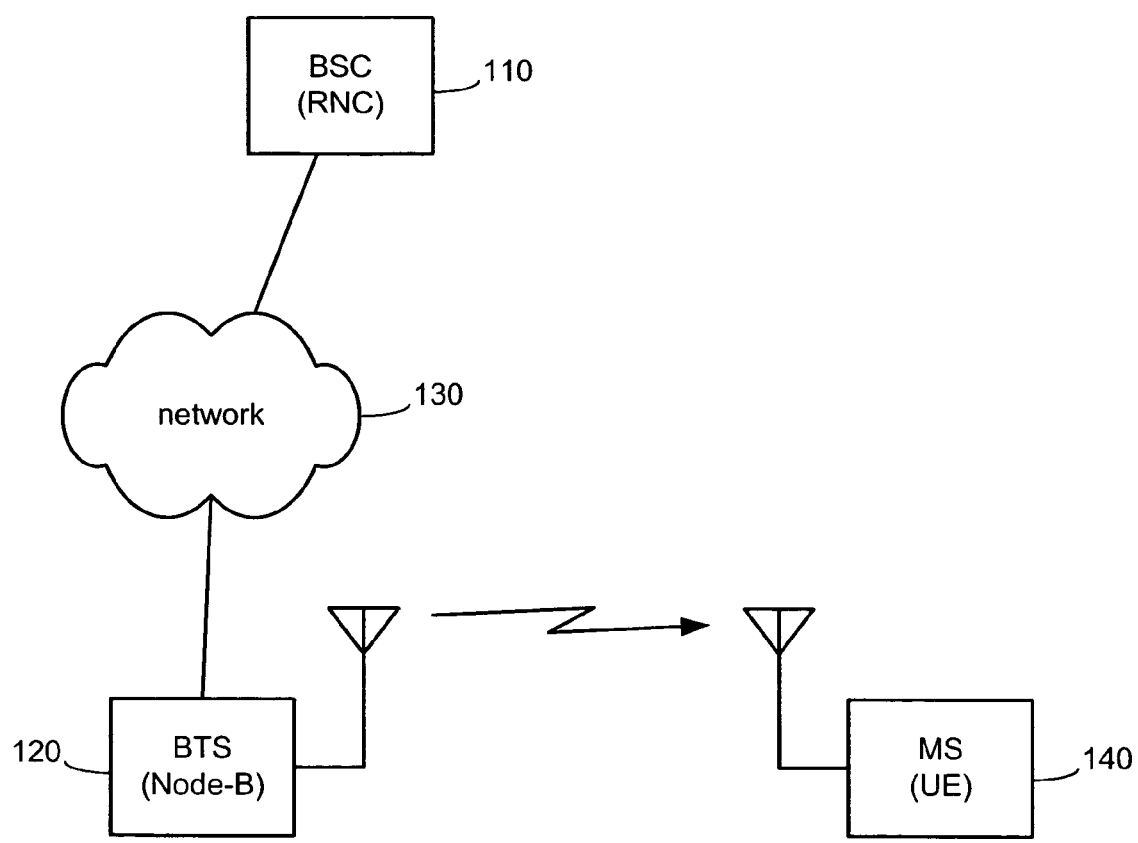
FIG. 1 is a diagram illustrating the high-level structure of a wireless telecommunications system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiments which are described.

DETAILED DESCRIPTION

One or more embodiments of the invention are described below. It should be noted that these and any other embodiments described below are exemplary and are intended to be illustrative of the invention rather than limiting.

As described herein, various embodiments of the invention comprise systems and methods for communicating control data for multiple physical data channels by transmitting control information for a first physical data channel on a physical control channel and combining the control information with information for a logical data channel and transmitting the combined information on a single physical data channel.

In one embodiment, a method is implemented in a WCDMA (wideband code division multiple access) communications system, such as might be designed in accordance with a release (e.g., Release 99) of the 3GPP standard. This method includes providing first data to be transmitted on a first data channel, second data to be transmitted on a second data channel, control information for the first data channel and control information for the second data channel. The first data and the control information for the second data channel are then encoded and multiplexed together. The multiplexed data is then transmitted on the first data channel, the second data is transmitted on the second data channel, and the control information for the first data channel is transmitted on a control channel. When the data transmitted on the various channels is received, the control information for the first data channel is decoded and used to decode the multiplexed data on the first data channel. The multiplexed data is decoded and demultiplexed to obtain the first data and the control information for the second data channel. The second data is then decoded using the control information for the second data channel.

As noted above, one embodiment of the invention is implemented in a wireless telecommunications system that is designed in accordance with a WCDMA standard. It will therefore be helpful to describe the basic structure and operation of such a system in order to aid in the understanding of the invention. It should be noted that, while the following description focuses primarily upon a system that follows this standard, alternative embodiments may be implemented in systems that follow other standards as well.

Referring to FIG. 1, a diagram illustrating the structure of a wireless telecommunications system in accordance with one embodiment is shown. System 100 includes a base station controller 110, a base station 120 that is coupled to base station controller 110 through a backhaul network 130, and a mobile station 140. System 100 may include additional base stations and mobile stations which, for purposes of clarity, are not shown in the figure.

The terminology used to refer to the components of the system may differ from one embodiment to another. For example, base station controller 110 may be referred to as a radio network controller (RNC), base station 120 may be referred to as a "Node-B," and mobile station 140 may be referred to as user equipment (UE). Because the various embodiments of the invention may be implemented in different types of wireless communication systems (e.g., systems designed according to different standards or different releases of the same standard,) references to the different components of the systems should be interpreted broadly, and references to particular components using terminology applicable to a particular type of system should not be construed to imply that the embodiments of the invention are limited to that particular type of system.

It should also be noted that, while the description herein of this and other embodiments focuses on a system in which a mobile station may move with respect to a base station, other embodiments may be implemented in systems that enable wireless communication between alternative types of devices. It is not necessary that one of the devices be a "base station," nor is it necessary that the other of the devices be "mobile." References herein to mobile stations and base stations should therefore be construed to include any wireless transceiver devices that are in communication with each other.

While, in practice, the specific designs of base station 120 and mobile station 140 may vary significantly, each serves as a wireless transceiver for communicating over the forward and reverse links. Base station 120 and mobile station 140 therefore have the same general structure. This structure is illustrated in FIG. 2.

Figure 2:
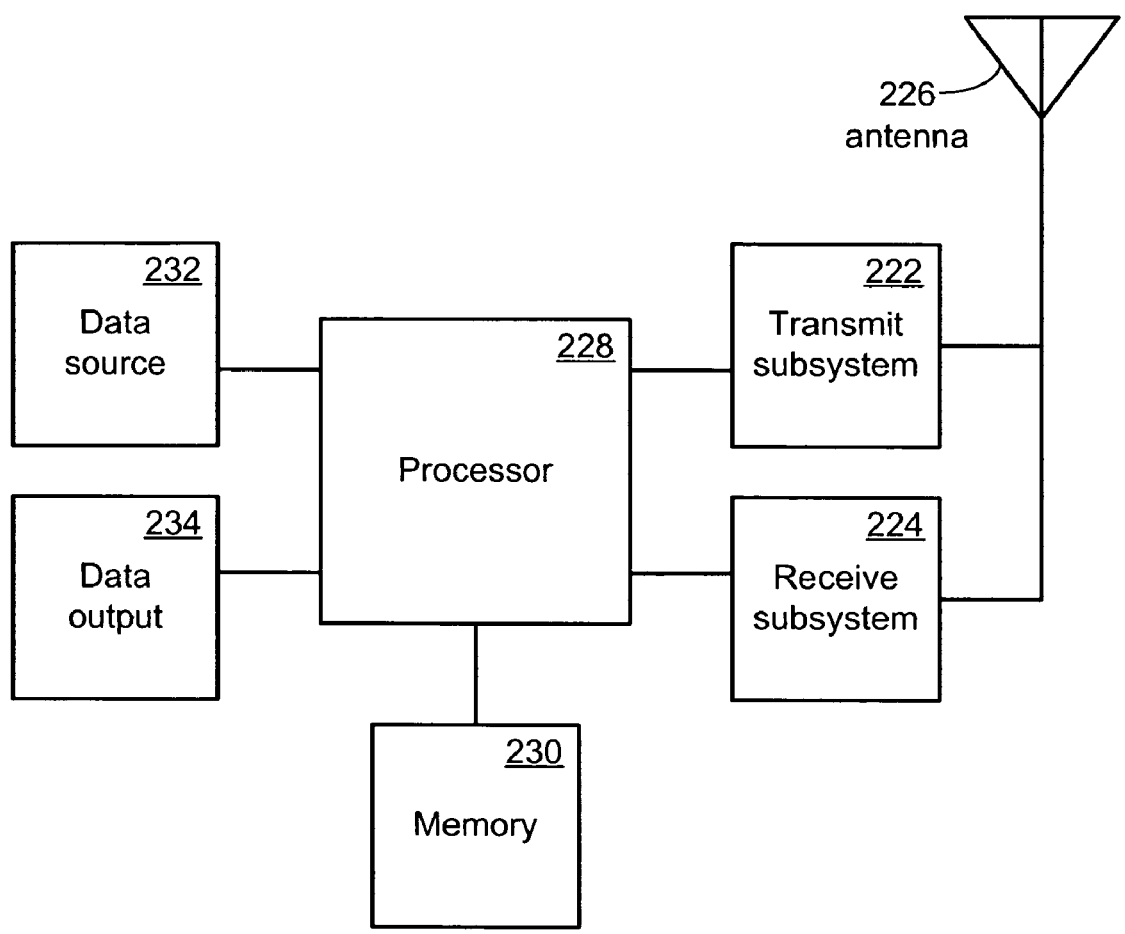
FIG. 2 is a functional block diagram illustrating the basic structural components of a wireless transceiver system in accordance with one embodiment.

Referring to FIG. 2, a functional block diagram illustrating the basic structural components of a wireless transceiver system in accordance with one embodiment is shown. As depicted in this figure, the system comprises a transmit subsystem 222 and a receive subsystem 224, each of which is coupled to an antenna 226. Transmit subsystem 222 and receive subsystem 224 may be collectively referred to as a transceiver subsystem. Transmit subsystem 222 and receive subsystem 224 access the forward and/or reverse link through antenna 226.

Transmit subsystem 222 and receive subsystem 224 are also coupled to processor 228, which is configured to control transmit and receive subsystems 222 and 224. Memory 230 is coupled to processor 228 to provide working space and local storage for the processor. Processor 228 and memory 230 may be collectively referred to as a processing subsystem. A data source 232 is coupled to processor 228 to provide data for transmission by the system. Data source 232 may, for example, comprise a microphone or an input from a network device. The data is processed by processor 228 and then forwarded to transmit subsystem 222, which transmits the data via antenna 226. Data received by receive subsystem 224 through antenna 226 is forwarded to processor 228 for processing and then to data output 234 for presentation to a user. Data output 234 may comprise such devices as a speaker, a visual display, or an output to a network device.

Persons of skill in the art of the invention will appreciate that the structure depicted in FIG. 2 is illustrative and that other embodiments may use alternative configurations. For example, processor 228, which may be a general-purpose microprocessor, a digital signal processor (DSP) or a special-purpose processor, may perform some or all of the functions of other components of the transceiver, or any other processing required by the transceiver. The scope of the claims set forth below are therefore not limited to the particular configurations described herein.

Mobile station 140 typically is not stationary (although, in some instances, it may be.) Mobile station 140 is instead likely to move with respect to base station 120. The changing position of mobile station 140 typically causes the channel conditions for the wireless link between mobile station 140 and base station 120 to vary. The channel conditions may also be affected by other factors, such as atmospheric conditions, movement of other objects between mobile station 140 and base station 120, interference from other transmitters, and so on.

Because of the changes in the channel conditions for the wireless communication link, there may be changes in the data rate at which mobile station 140 transmits data to base station 120. These changes in the data rates used by mobile station 140 to transmit the data are necessary to provide a high enough signal-to-noise ratio, SNR, (or signal-to-interference-and-noise ratio, SINR,) that base station 120 will receive the data with an acceptable error rate. The better the channel conditions, the higher the data rate that can be used by the mobile station. The worse the channel conditions, the lower the data rate that must be used by the mobile station.

The data rate and corresponding data format for one or more channels may, in some embodiments, be referred to as a transport format (TF) or transport format combination (TFC). For purposes of clarity, individual transport formats as well as transport format combinations may be referred to below simply as data rates.

In one embodiment, the mobile station of the wireless telecommunications system is configured to transmit information to the base station on three channels. The first of these channels is a dedicated data channel. This data channel may carry various types of data, including such high priority data as voice data, streaming video or the like, and lower priority data, the delivery of which is not delay-sensitive. This dedicated data channel may be referred to herein as the primary data channel. The second of the channels is a control channel. The control channel carries control information that is needed by the base station in order to properly decode the data transmitted on the primary data channel. This control information may, for example, include pilot channel information, power control information and data rate information. These different types of information may also be characterized as different logical channels within the physical control channel.

The primary data channel and the control channel are found in conventional WCDMA systems. Typically, for each information block that is transmitted on the primary data channel, there is corresponding information that is transmitted on the control channel. The information contained in the control channel is received by the base station, decoded, and then used to decode the information in the data channel. The control channel may be transmitted synchronously with the corresponding data channel, or it may be transmitted prior to transmission of the corresponding data channel.

In the present embodiment, in addition to the primary data channel and the control channel, a third channel (an enhanced dedicated data channel) is transmitted from the mobile station to the base station. The enhanced data channel is used in this embodiment to transmit data for high-speed, non-delay-sensitive services. In alternative embodiments, other types of data may be transmitted. While it is necessary to transmit control information for the enhanced data channel to the base station so that the base station can decode the data received via the enhanced data channel, this control information is not transmitted in a control channel that is separate from the control channel described above. Instead, the control information for the enhanced data channel is combined with information for a logical data channel, and the combined information is transmitted from the mobile station to the base station on the primary dedicated data channel. The manner in which this is accomplished is described in detail below.

Figure 3:
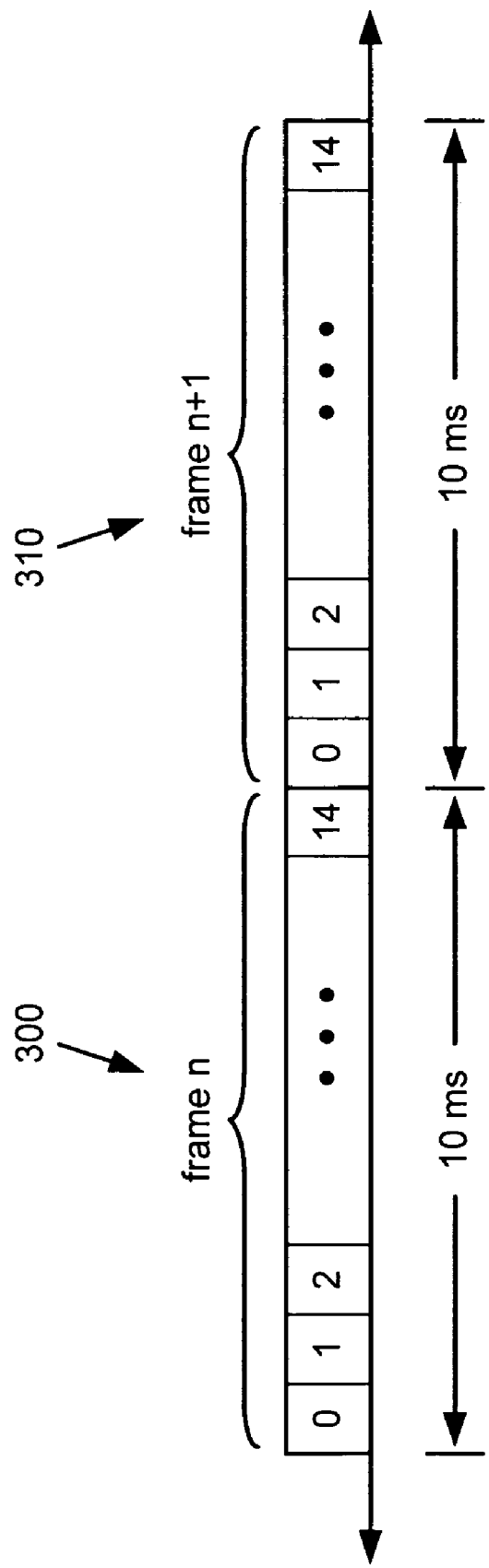
FIG. 3 is a diagram illustrating the structure of frames of data transmitted on a pair of data channels and a control channel in accordance with one embodiment.

In the present embodiment, all three of the channels (the primary dedicated data channel, the dedicated control channel and the enhanced dedicated data channel) use the same frame format. This format is illustrated in FIG. 3. FIG. 3 shows two frames, 300 and 310. As shown in this figure, each frame spans ten milliseconds. Each frame is further broken down into 15 slots.

Figure 4:
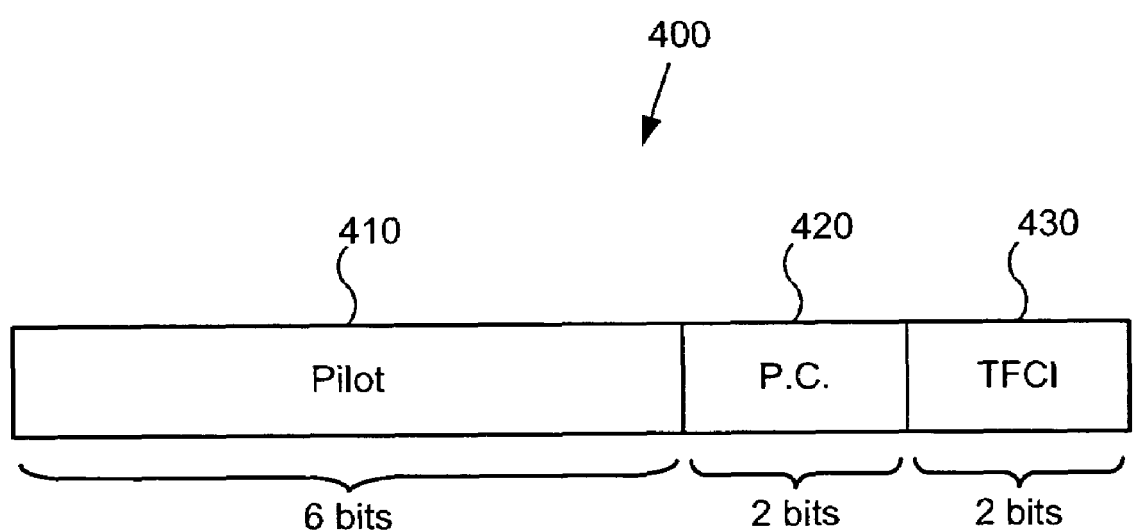
FIG. 4 is a diagram illustrating the structure of the control information within each slot of a control frame in accordance with one embodiment.

As mentioned above, the control channel is used in this embodiment to transmit control information including pilot data, power control data and data rate information. Referring to FIG. 4, a diagram illustrating the structure of this information within each slot is shown. FIG. 4 depicts a single slot 400. Contained within slot 400 is pilot data 410, power control data 420 and TFCI (transport format combination indicator) information 430. Slot 400 consists of ten data bits. Six of these ten bits are used to convey pilot data 410, while two bits are used as power control data 420 and two bits are used for TFCI information 430.

While TFCI information 430 comprises only two bits of each slot, more than two bits are available to communicate the TFCI value. This is because the selected transport formats used by the mobile station to transmit data on the primary and enhanced data channels are updated on a frame by frame basis. In other words, while each data channel can select a different transport format for each succeeding frame, the transport format remains unchanged during the frame. Thus, all of the 30 TFCI bits in the frame (two bits times fifteen slots,) rather than only the two TFCI bits in a single slot, are available to communicate the selected TFCI value.

It should be noted that, while 30 of the bits transmitted in a frame are dedicated to transmitting TFCI information from the mobile station to the base station, less than 30 bits of actual transport format information are communicated. This is because the transport format information is encoded before being transmitted. This encoding process is similar to the encoding that is performed on the data communicated on the data channels. The encoding is intended to increase the reliability with which the data is communicated.

Figure 5:
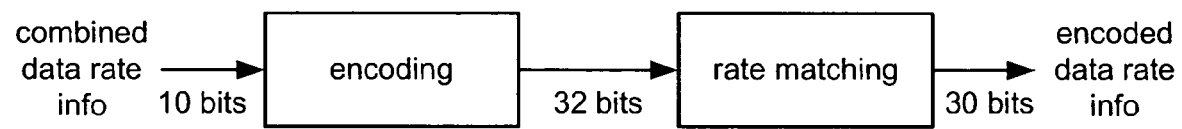
FIG. 5 is a flow diagram illustrating the process through which data rate information is encoded in accordance with one embodiment.

The encoding increases the number of bits that need to be transmitted. Referring to FIG. 5, a flow diagram illustrating the process through which data rate information is encoded in accordance with one embodiment is shown. In this figure, data rate information (TFCI) is encoded (block 510.) In this case, the encoder implements a ⅓ encoding scheme. The encoding consists of covering the original data rate information with spreading codes in a manner which is well known to persons of skill in the field of WCDMA communications. In the case of the TFCI information, the encoding of the original TFCI value, which consists of ten data bits, results in 32 bits of encoded rate information data. Because the control data format described above in connection with FIG. 4 makes available only 30 bits for data rate information, some form of rate matching must be performed (block 520.) In one embodiment, the rate matching function may simply consist of "puncturing" the encoded data, or dropping the last two bits. The resulting 30 bits of encoded TFCI information can then be transmitted from the mobile station to the base station by transmitting the first two bits in the first slot of the frame, the next two bits in the second slot of the frame, and so on, until all 30 bits have been transmitted.

As noted above, only a single control channel is used in conjunction with two data channels in this embodiment. The TFCI data that is communicated in each frame of this control channel corresponds to a TFCI value for the first of the data channels (the primary dedicated data channel, in this embodiment.) The TFCI information communicated via the control channel is therefore useful only in the decoding of the first data channel. The TFCI information for the second data channel (the enhanced dedicated data channel in this embodiment) is instead communicated via the first data channel.

Each of the two data channels described above is a dedicated physical channel. Each of these physical channels has a different set of spreading codes and can be separately transmitted/received and encoded/decoded. Each of the physical channels, however, can carry two or more logical or virtual channels. These channels may also be referred to as transport channels. It is not unusual for a dedicated physical data channel to include data from multiple sources on multiple logical data channels. For instance, one physical data channel may carry a first logical data channel that conveys voice information and a second logical data channel that conveys information corresponding to data services (e.g., internet access data.)

When multiple logical data channels are multiplexed onto a single physical data channel, it is necessary to provide some indication of how the logical data channels will be multiplexed together in order to enable the base station to demultiplex the channels after they are received. For example, if two logical data channels, A and B, may be multiplexed onto a particular physical data channel, there may be four possibilities: both channels A and B are transmitted; channel A is transmitted, but channel B is not; channel B is transmitted, but channel A is not; and neither channel A nor channel B is transmitted. These four possibilities can be communicated using two bits, each of which represents one of the channels. If a bit is set to 0, the corresponding channel is not transmitted, and if the bit is set to 1, the corresponding channel is transmitted. The four possibilities described above can therefore be represented by the bits 11, 10, 01, and 00, respectively.

If the manner in which the logical data channels are multiplexed together does not change, these two bits may be sufficient to describe the multiplexing of the corresponding data. For instance, it may be predetermined that all of the even bits on the physical data channel correspond to the first logical channel and all of the odd bits on the physical data channel correspond to the second logical channel. If the type of multiplexing can change, it may be necessary to use additional bits to indicate the manner in which the data is multiplexed. Additional bits may also be used to indicate other details about the manner in which the data is formatted on the physical data channel. The multiplexing and demultiplexing of the data corresponding to the logical data channels is known to persons of skill in the art.

While it is not unusual for dedicated physical data channels to carry multiple logical data channels, physical data channels conventionally do not carry any control data. In the present embodiment, however, the control data that is necessary for the decoding of the second dedicated physical data channel is multiplexed with one or more logical data channels on the first dedicated physical data channel, rather than being conveyed conventionally (i.e., on a separate dedicated physical control channel.)

As pointed out above, the present embodiment includes three physical channels that are used to convey information from a mobile station to a base station: a first dedicated physical data channel; a second dedicated physical data channel; and a dedicated physical control channel. The control information that is necessary to properly decode the data transmitted on the first dedicated physical data channel is transmitted on the dedicated physical control channel. The control information necessary to decode the data transmitted on the second dedicated physical data channel, however, is transmitted on the first dedicated physical data channel. This control information is treated in the same manner as a logical data channel that is carried by the first dedicated physical data channel, and is multiplexed together with one or more of these logical data channels. The combined data of the multiplexed channels is then transmitted via the first dedicated physical data channel.

Figure 6:
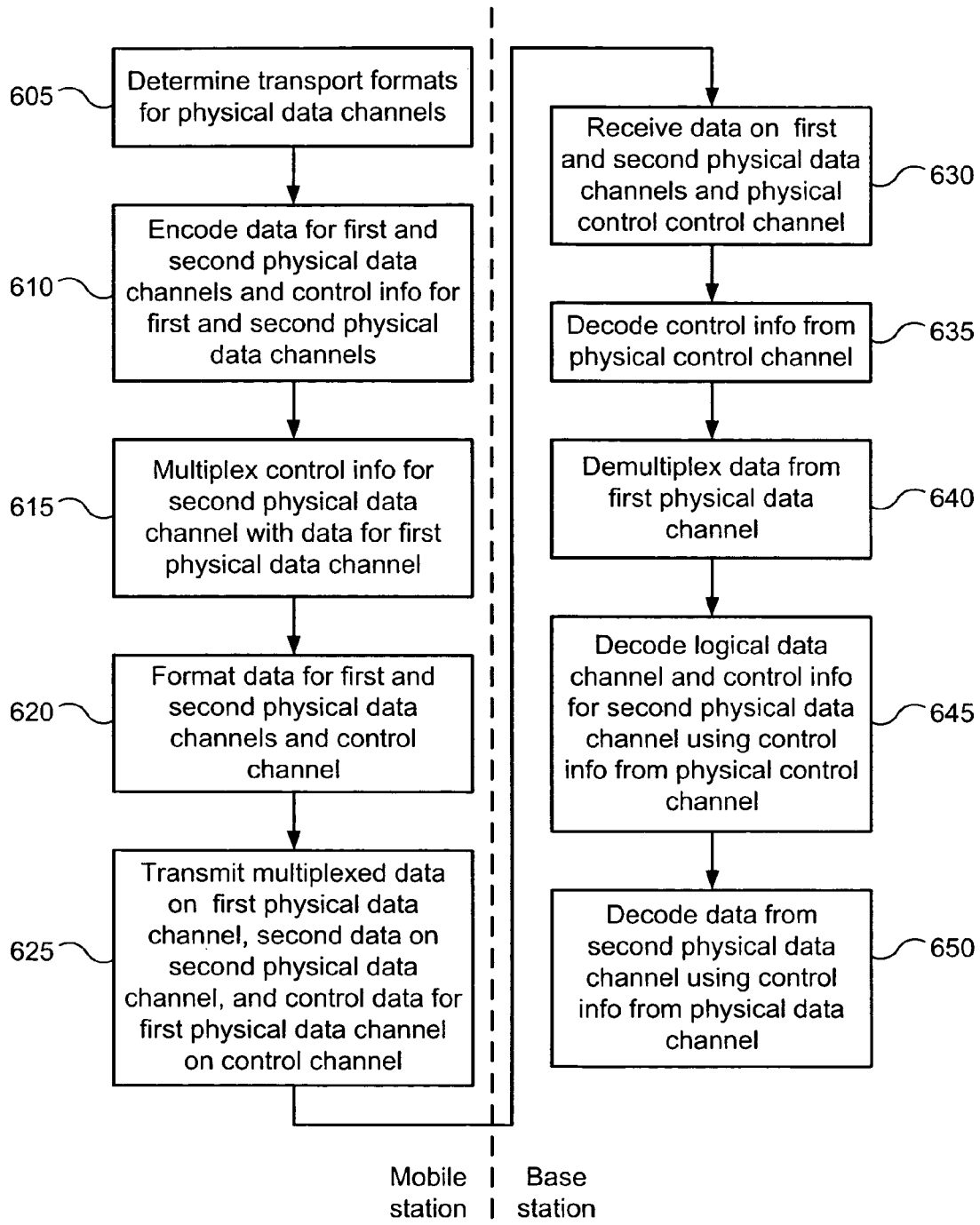
FIG. 6 is a flow diagram illustrating the process of combining the control information with information for a logical data channel and transmitting the combined information on a single physical data channel in accordance with one embodiment.

The method employed in this embodiment is described in detail below in connection with FIG. 6. FIG. 6 is a flow diagram illustrating the process of combining the control information for the second physical data channel with one or more logical data channels, transmitting the combined data and be cutting the first and second physical data channels using the corresponding control information. It should be noted that the method depicted in the figure includes a portion on the left side of the figure that corresponds generally to the portion of the method that is performed by a mobile station, and a portion on the right side of the figure that is performed by a base station. It should be noted that, in addition to the entire method depicted in the figure, the first and second portions of the method may, in themselves, be considered alternative embodiments.

Referring to FIG. 6, the transport format information for the first and second physical data channels is first determined (block 605.) This includes selection of appropriate transport format combinations and TFCI values. Then, the transport format information for the two physical data channels and the data corresponding to the logical data channels is encoded (block 610.) In this embodiment, the different data are separately encoded. That is, each of the logical data channels, the transport format information for the first physical data channel and the transport format information for the second physical data channel is encoded separately. The encoding can be performed using any suitable methodology, a number of which are well known in the art.

It should be noted that the control information for the second may not necessarily include all of the information that is normally transmitted on the control channel. For example, as indicated above, the slots transmitted on the physical control channel normally include pilot data, power control data and TFCI data. The control information for the second physical data channel need not include the pilot and power control data, as this data would be redundant with transmission of the control information for the first physical data channel.

After the control information and the data for the logical data channels are encoded, the control information for the second physical data channel is multiplexed with the data corresponding to the logical data channels that will be transmitted via the first physical data channel (block 615.) The multiplexing of the logical channel data and the control information can be performed in a variety of ways. In one embodiment, the multiplexing may consist of interleaving the different data with each other. If there is more data from one of the sources that needs to be transmitted, the multiplexed data may consist of more bits from one source than the other source.

The data to be transmitted on each of the physical channels is then formatted for the appropriate channels (block 620.) For example, the control information for the first physical data channel is formatted into control frames (and slots) suitable for transmission via the physical control channel. Similarly, the data to be transmitted on the first physical data channel (i.e., the multiplexed logical channel data and control information for the second physical data channel) is formatted into frames/slots are suitable for transmission via the first physical data channel. This formatting for the first physical data channel is indicated by the TFCI information that is transmitted via the physical control channel. Finally, the data to be transmitted on the second physical data channel is formatted into frames/slots are suitable for transmission via the second physical data channel. The formatting for the second physical data channel is indicated by the control (TFCI) information that is multiplexed with the logical data channels and transmitted via the first physical data channel.

After the data for the different physical channels is appropriately formatted, the data is transmitted on the corresponding channels (block 625.) The control information for the first physical data channel is transmitted on the physical control channel, while the multiplexed data (the data for the first physical data channel and the control information for the second physical data channel) is transmitted on the first physical data channel, and the data for the second physical data channel is transmitted on the second physical channel.

It should be noted that each frame transmitted on a physical data channel may be transmitted synchronously with the corresponding control frame/information (i.e., the two are transmitted at the same time,) or the control frame/information may be transmitted prior to the data frame. If the data frame and the corresponding control information are transmitted at the same time, the decoding of the data frame must be delayed until the control information (which is needed to decode the data frame) is decoded. If the control information is transmitted prior to the data frame, it may be possible to decode the control information and have this information available for the decoding of the data frame when the data frame is received.

After the data on the various channels is transmitted by the mobile station, the data is received by the base station (block 630.) In this embodiment, it is assumed that all of the data is transmitted synchronously, so that the corresponding frames of data/information are received at the same time.

The first data to be decoded is the control information that is transmitted via the physical control channel (block 635.) Without this control information, neither the data received on the first physical control channel nor the data received on the second physical data channel can be decoded. As noted above, the control information transmitted on the physical control channel corresponds to the first physical data channel. Consequently, after the control information received via the physical control channel is decoded, the base station has enough information to decode the first physical data channel. The base station therefore proceeds to decode the data received via the first physical data channel using this control information (block 645.)

In this embodiment, because the data transmitted on the first physical data channel was encoded before it was multiplexed together, the data is demultiplexed before the respective components (i.e., the logical data channel and the control information) are decoded (block 640.) In alternative embodiments, the data may be multiplexed before it is encoded by the mobile station. In this case, the base station would the first decode the multiplexed in data, and then demultiplexed the data into the logical data channel and control information.

After the data received on the first physical data channel has been decoded and demultiplexed (or demultiplexed and decoded,) the control information corresponding to the second physical data channel is available. The data received via the second physical data channel can therefore be decoded using the control information received via the first physical data channel (block 650.)

It should be noted that numerous variations may be made in the embodiments described above without departing from the scope of the invention as detailed in the claims below. For instance, while the foregoing embodiments involve the multiplexing of control information for a single physical data channel onto another physical data channel, an alternative embodiment might multiplex control information for multiple physical data channels onto another physical data channel. In another example, where the embodiments described above involve the multiplexing of control information with a single logical data channel, the control information might, in alternative embodiments, be multiplexed with multiple logical data channels. In another alternative embodiment, the control information might be multiplexed with logical data channels on multiple physical data channels. Various other alternative embodiments will also be apparent to a person of skill in the art upon reading this disclosure.

Although not discussed in detail above, it should be noted that the functionality described above may be implemented in the mobile stations and base stations described above by providing suitable programs that are executed in the respective processing subsystems of these devices. These program instructions are typically embodied in a storage medium that is readable by the respective processing subsystems. Exemplary storage media may include RAM memory, flash memory, ROM memory, EPROM memory, EEPROM memory, registers, hard disk, a removable disk, a CD-ROM, or any other form of storage media known in the art. Such a storage medium embodying program instructions for implementing the functionality described above comprises an alternative embodiment of the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and method steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. It should also be noted that the illustrative components, blocks, modules, circuits, and steps may be reordered or otherwise reconfigured in alternative embodiments. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method implemented in a wireless communication system, the method comprising:
    providing first data to be transmitted on a first data channel, second data to be transmitted on a second data channel, control information for the first data channel and control information for the second data channel;
    encoding and multiplexing the first data with the control information for the second data channel;
    transmitting the multiplexed data on the first data channel, transmitting the second data on the second data channel, and transmitting the control information for the first data channel on a control channel; and
    decoding the control information for the first data channel, decoding the multiplexed data using the control information for the first data channel, demultiplexing the multiplexed data into the first data and the control information for the second data channel, and decoding the second data using the control information for the second data channel.

2. The method of claim 1, wherein the method is implemented in a WCDMA communication system.

3. The method of claim 1, wherein the control information for the first data channel comprises a transport format combination indicator for the first data channel and the control information for the second data channel comprises a transport format combination indicator for the second data channel.

4. The method of claim 1, wherein multiplexing the first data with the control information for the second data channel comprises multiplexing data for multiple logical data channels with the control information for the second data channel.

5. The method of claim 1, wherein multiplexing the first data with the control information for the second data channel comprises multiplexing data for one or more logical data channels with the control information for the second data channel and control information for at least one additional data channel.

6. The method of claim 1, wherein encoding the first data and the control information for the second data channel comprises covering the first data and the control information for the second data channel with spreading codes.

7. The method of claim 1, wherein multiplexing the first data with the control information for the second data channel comprises interleaving bits of the first data with bits of the control information for the second data channel.

8. A method implemented in a mobile station for a wireless communication system, the method comprising:
providing first data to be transmitted on a first data channel, second data to be transmitted on a second data channel, control data for the first data channel and control data for the second data channel;
multiplexing the first data with the control data for the second data channel; and
transmitting the multiplexed data on the first data channel, transmitting the second data on the second data channel, and transmitting the control data for the first data channel on a control channel.

9. The method of claim 8, wherein the method is implemented in a mobile station for a WCDMA communication system.

10. The method of claim 8, wherein the control information for the first data channel comprises a transport format combination indicator for the first data channel and the control information for the second data channel comprises a transport format combination indicator for the second data channel.

11. The method of claim 8, wherein multiplexing the first data with the control information for the second data channel comprises multiplexing data for multiple logical data channels with the control information for the second data channel.

12. The method of claim 8, wherein multiplexing the first data with the control information for the second data channel comprises multiplexing data for one or more logical data channels with the control information for the second data channel and control information for at least one additional data channel.

13. The method of claim 8, wherein encoding the first data and the control information for the second data channel comprises covering the first data and the control information for the second data channel with spreading codes.

14. The method of claim 8, wherein multiplexing the first data with the control information for the second data channel comprises interleaving bits of the first data with bits of the control information for the second data channel.

15. A method implemented in a base station for a wireless communication system, the method comprising:
receiving data on a first data channel, a second data channel, and a control channel;
decoding control data received via the control channel;
using the control data received via the control channel to decode multiplexed data received via the first data channel;
demultiplexing the multiplexed data received via the first data channel to obtain additional control data; and
using the additional control data received via the first data channel to decode data received via the second data channel.

16. The method of claim 15, wherein the method is implemented in a base station for a WCDMA communication system.

17. The method of claim 15, wherein the control data received via the control channel comprises a first transport format combination indicator for the first data channel and the additional control data received via the first data channel comprises a second transport format combination indicator for the second data channel.

18. A wireless communication system comprising:
a mobile station configured to
provide first data to be transmitted on a first data channel, second data to be transmitted on a second data channel, control information for the first data channel and control information for the second data channel,
encode and multiplex the first data with the control information for the second data channel, and
transmit the multiplexed data on the first data channel, transmit the second data on the second data channel, and transmit the control information for the first data channel on a control channel; and
a base station configured to
receive the multiplexed data on the first data channel, the second data on the second data channel, and the control information for the first data channel on the control channel
decode the control information for the first data channel,
decode the multiplexed data using the control information for the first data channel,
demultiplex the multiplexed data into the first data and the control information for the second data channel, and
decode the second data using the control information for the second data channel.

19. The wireless communication system of claim 18, wherein the wireless communication system comprises a WCDMA communication system.

20. The wireless communication system of claim 18, wherein the control information for the first data channel comprises a transport format combination indicator for the first data channel and the control information for the second data channel comprises a transport format combination indicator for the second data channel.

21. The wireless communication system of claim 18, wherein the mobile station is configured to multiplex the first data with the control information for the second data channel by multiplexing data for multiple logical data channels with the control information for the second data channel.

22. The wireless communication system of claim 18, wherein the mobile station is configured to multiplex the first data with the control information for the second data channel by multiplexing data for one or more logical data channels with the control information for the second data channel and control information for at least one additional data channel.

23. The wireless communication system of claim 18, wherein the mobile station is configured to encode the first data and the control information for the second data channel by covering the first data and the control information for the second data channel with spreading codes.

24. The wireless communication system of claim 18, wherein the mobile station is configured to multiplex the first data with the control information for the second data channel by interleaving bits of the first data with bits of the control information for the second data channel.

25. A mobile station for a wireless communication system comprising:
- a transceiver subsystem; and
- a processing subsystem coupled to the transceiver subsystem and configured to
  - provide first data to be transmitted on a first data channel, second data to be transmitted on a second data channel, control data for the first data channel and control data for the second data channel, and
  - multiplex the first data with the control data for the second data channel; and
- wherein the transceiver subsystem is configured to transmit the multiplexed data on the first data channel, transmit the second data on the second data channel, and transmit the control data for the first data channel on a control channel.

26. The mobile station of claim 25, wherein the mobile station is configured to be used in a WCDMA communication system.

27. The mobile station of claim 25, wherein the control information for the first data channel comprises a transport format combination indicator for the first data channel and the control information for the second data channel comprises a transport format combination indicator for the second data channel.

28. The mobile station of claim 25, wherein the processing subsystem is configured to multiplex the first data with the control information for the second data channel by multiplexing data for multiple logical data channels with the control information for the second data channel.

29. The mobile station of claim 25, wherein the processing subsystem is configured to multiplex the first data with the control information for the second data channel by multiplexing data for one or more logical data channels with the control information for the second data channel and control information for at least one additional data channel.

30. The mobile station of claim 25, wherein the processing subsystem is configured to encode the first data and the control information for the second data channel by covering the first data and the control information for the second data channel with spreading codes.

31. The mobile station of claim 25, wherein the processing subsystem is configured to multiplex the first data with the control information for the second data channel by interleaving bits of the first data with bits of the control information for the second data channel.

32. A base station for a wireless communication system comprising:
- a transceiver subsystem configured to receive data on a first data channel, a second data channel, and a control channel; and
- a processing subsystem coupled to the transceiver subsystem and configured to decode control data received via the control channel,
  - use the control data received via the control channel to decode multiplexed data received via the first data channel,
  - demultiplex the multiplexed data received via the first data channel to obtain additional control data, and
  - use the additional control data received via the first data channel to decode data received via the second data channel.

33. The base station of claim 32, wherein the base station is configured to be used in a WCDMA communication system.

34. The base station of claim 32, wherein the control data received via the control channel comprises a first transport format combination indicator for the first data channel and the additional control data received via the first data channel comprises a second transport format combination indicator for the second data channel.

* * * * *